United States Patent [19]
Liebermann

[11] Patent Number: 5,642,658
[45] Date of Patent: Jul. 1, 1997

[54] ADJUSTABLE HINGE APPARATUS

[76] Inventor: Benno E. Liebermann, 2805 Lime Kiln La., Louisville, Ky. 40222

[21] Appl. No.: 673,925

[22] Filed: Jul. 1, 1996

[51] Int. Cl.⁶ .............................. A22C 7/00; A47J 27/62; A47J 37/06; A47J 37/12

[52] U.S. Cl. .................. 99/349; 99/355; 99/379; 99/423; 100/324; 100/325

[58] Field of Search .............................. 99/326–331, 335, 99/336, 342–349, 375, 372, 377–379, 390, 389, 391, 383, 400, 394, 424–426, 430; 219/524, 525, 443; 100/93 P, 233; 126/394, 41 R, 41 A, 41 C

[56] References Cited

U.S. PATENT DOCUMENTS

| | | | |
|---|---|---|---|
| 3,750,563 | 8/1973 | Tonjum | 99/349 X |
| 4,224,864 | 9/1980 | Wendell | 99/355 X |
| 4,483,239 | 11/1984 | Mueller | 99/379 X |
| 4,586,428 | 5/1986 | Adamson | 99/332 |
| 4,601,237 | 7/1986 | Harter et al. | 99/349 |
| 4,697,504 | 10/1987 | Keating | 126/41 R |
| 4,700,619 | 10/1987 | Scanlon | 99/422 X |
| 4,972,766 | 11/1990 | Anetsberger | 219/524 X |
| 5,095,813 | 3/1992 | Escamilla et al. | 100/93 P |
| 5,197,377 | 3/1993 | Jennings et al. | 99/390 X |
| 5,341,727 | 8/1994 | Dickson | 99/335 |
| 5,381,725 | 1/1995 | Breunig et al. | 100/910 |
| 5,473,976 | 12/1995 | Hermansson | 99/349 |

Primary Examiner—Timothy F. Simone
Attorney, Agent, or Firm—Middleton & Reutlinger; David W. Carrithers

[57] ABSTRACT

The present invention relates to an adjustable hinge apparatus and spacer means for use with a low temperature grill having multiple stacked heating plates and at least one support rod extending across one side of the grill to form a common pivot axis. The hinge apparatus includes an array of adjustable floating hinges formed to be positioned adjacent one another pivotally supported on the support rod. Each hinge includes a hinge block having a slide aperture therethrough sized and shaped for receiving a support arm member extending therethrough in the vertical plane and being slidably supported therein at a selected position in order to support the plates at a selected height. The support blocks also include a pivot aperture therethrough positioned substantially normal to the support arm aperture being sized and shaped for receiving the horizontal support rod therethrough. The support arm members of adjacent hinge blocks are formed with offset bends for attachment with consecutively stacked heating plates. The hinge block of each floating hinge is formed to rotate on the support rod perpendicular to the pivot axis and independently of adjacent hinges. The floating hinge apparatus of the present invention provides a means for variable spacing and free floating vertical movement between heating plates to maintain the plates equal distance in the horizontal plane while rotating on a common pivot point.

14 Claims, 4 Drawing Sheets

ADJUSTABLE HINGE APPARATUS

BACKGROUND OF THE INVENTION

The present invention relates to a hinge apparatus. More particularly to an adjustable hinge apparatus for use with a multi-deck grill such as disclosed in U.S. patent applications Ser. No. 08/519,831 and Ser. No. 08/229,581 incorporated by reference herein.

Conventional hinge apparatus have a single common pivot point, whereby the top, i.e. "top plate", is hinged to the bottom, i.e. "housing". When utilizing a plurality of plates thereinbetween, conventional hinge apparatus employ a plurality of hinging points, whereby some type of bracket assembly is required so that the hinge for each set of plates is positioned on or about the same vertical level as the set of plates forming the top and bottom heating surface. Even so, conventional plates do not utilize a mechanism which is adaptable to quick and easy spacing depending upon the thickness of the products to be heated thereinbetween. Usually the products are squeezed tighter near the portions of the plates closer to the hinge, especially if the spacing between the pivot point of the top and bottom plates are arranged too close together. This results in the food articles between the plates near the hinge being squeezed and absorbing to much heat under pressure, and the food articles farther away from the hinge making poor or no contact with the heating surface of the top plate. Floating type hinges know in the art usually employ some type of slotted arrangement whereby a holding member is slidably supported by a straight or curved slotted bracket allowing for the plate to be lifted into a spaced apart horizontal position.

The multi-plate as disclosed in the above-identified patent applications utilize a number of thin, heat transfer plates having a heat transfer fluid circulating therethrough wherein the temperature is controlled at a selected low temperature for cooking food products or staging, (holding precooked products at a desired temperature), food articles. The food articles may be in raw, frozen, or cooked form. It may be prepacked in plastic flexible containers, no containers, or sealed or unsealed preformed containers composed of paper, polymeric material, or metal such as soup cans.

This type of grill provides a means for the user to cook or heat with multiple heating plates. It is important to heat the food articles using the radiant and/or conductive heat by placing the food articles or containers in between a pair of plates or more particularly, a pair of heating surfaces. Of course, the housing incorporates a plate having at least one upper heating surface. It is preferable to use the same type of heat transfer media in the top heating surface of the housing as used to heat the top or intermediate plates. Therefore, the conducting heat transfer material for all of the heating surfaces should be the same and be heated using the same heating media at the same temperature as the other plates to maintain control over the cooking or staging process. Likewise, the top plate may utilize a top heating surface or be covered with an insulation material depending upon the preference of the user. The instant invention provides a means for having at least one bottom heating means having a top heating surface covered by a plate having at least a bottom heating surface, wherein the top plate is hingedly connected to the housing. Preferably, the grill will utilize a plurality of plates therein between utilizing top and bottom heating surfaces.

Precision temperature control in the grill of the preferred embodiment is achieved by elevation the temperature of heat transfer fluid in a small tank, and then circulating said heated fluid through tin shelves, in a radiator-like fashion, within a multi-deck grilling cabinet configuration. The heated liquid continuously recirculates back to the reservoir via a magnetically driven centrifugal pump—thereby guaranteeing that a constant "flow" of uniformly headed media is maintained across all shelves of the respective grill plates, are thus eliminated, and the precise conduction heat transfer temperature of all plates is absolutely consistent throughout the apparatus within the narrow temperature range of about $\pm/-4°$ F., and preferably within a narrow temperature range of about $\pm/-2°$ F. of the set grill surface temperature.

High energy transfer efficiency, from the heat source to the food, is achieved via low-temperature conduction rather than by high-temperature, conventional grilling techniques. Heat is in direct contact (via metal plates) to the food, thereby requiring the input of significantly lower British thermal units (Btu's) to affect and maintain efficient heat transfer, and to cook and stage food articles at bacteriologically safe, equilibrated temperatures and succulent doneness levels, consistently without reliance on subjective human judgment and cooking expertise.

Preferably, the food articles are specially packaged in plastic films specifically designed for the process and approved by the USDA and FDA for contact with food articles for human consumption. The unique, proprietary peel-sealed food package, therefore, becomes the "oven" in which the respective food article is cooked and staged on each grill plate, ready for hot consumption at retail. However, foods may be placed upon the grill for warming food articles such as pastries, or prepacked food in rigid containers may be heated thereby.

SUMMARY OF THE INVENTION

The present invention comprises a multiple-hinged, flotation and horizontally parallel-tilting mechanism to align a multitude of perpendicularly staggered plates in precise horizontal alignments with selectable height distances relative to each to other. The adjustable hinge apparatus is designed to provide a relatively simple and inexpensive, horizontally floating and tilting hinge mechanism for the variable height distance alignment of a plurality of staggered, multi-deck heating grill plates. The floating hinge arrangement is necessary to accommodate the conduction efficiencies and close-tolerance radiation of temperature to food articles places in packaged format between a multitude of heated grill plate surfaces. Moreover packaged food articles may require a variety of plate alignment distances in heights relative to each other in order to maximize low-temperature conduction efficiencies in food articles of different packaging configurations and cross-sectional thicknesses. The floating hinge apparatus of the present invention provides an infinitely variable and perfectly horizontal alignment on all four corners of each respective heating grill plate surface. In one preferred embodiment of the present invention, an adjustable hinge apparatus is provided for use with a grill having multiple stacked heating plates and a horizontal support rod extending from one side of the grill, preferably the rear side, to form a common pivot axis. The floating hinge apparatus comprises an array of adjustable hinges formed to be positioned adjacent one another on a support rod. Each floating hinge includes a hinge block having a pivot aperture generally positioned in the horizontal axis in alignment with the pivoting side of the grill sized for pivoting or rotating movement of the horizontal support rod extending therethrough. Each floating hinge block also includes a slide aperture generally positioned in the vertical axis and normal to the pivot aperture, wherein the slide aperture provides a means for sliding movement of a plate support arm member extending through the hinge block. The plate support arms of adjacent hinge blocks are formed for attachment with consecutively stacked heating plates and the hinge block of each hinge is formed to pivot or rotate on the support rod perpendicular to the pivot axis and independently of adjacent hinge blocks. The adjustable hinge apparatus of the present invention allows the heating plates to self-adjust relative to one another to accommodate various thickness of food articles between two sets of plates and providing means for pivoting the stacked heating plates simultaneously about a common pivot axis.

In the preferred embodiment, two floating hinge sets comprise a pair of adjustable floating hinges situated on opposite ends of a horizontal support rod in spaced-apart relation to one another. Each floating hinge set includes a plurality of adjustable floating hinges, three are shown in the drawings, positioned in mirror-image orientation relative to one another. Each set of floating hinges include an inner hinge block formed for attachment to a top plate, a center hinge block formed for attachment to a middle plate, and an outer hinge block formed for attachment with a lower plate spaced apart from the top heating surface of the grill housing.

Each floating hinge block set is held in side-by-side orientation by bushings which promote the independent sliding of the floating hinge blocks relative to one another and permit the floating hinge blocks to tilt to an ajar orientation to accommodate various thickness of food articles between the plates. The floating hinge sets are prevented from sliding on the support rod parallel to the pivot axis by spacer means. The spacer means are attached to the support rod and positioned in spaced-apart relation to one another between the floating hinge sets.

The hinge block of each floating hinge is generally square or rectangular in shape, however, it can be formed in any shape to support the hinge arm and support rod extending therethrough. The plate arm support member may be a rod, tube, or other such longitudinal member. The plate arm support member is bent downward at about a ninety (90) degree angle so that a portion of the plate support arm member supporting the plate is oriented in the horizontal plate and the portion in slidable engagement with the hinge block is oriented in the vertical plane. The plate support arm member is slidably received within the slide aperture whereby the length of the arm extending downward in the vertical direction through the slide aperture may be adjusted so that the horizontal portion of the arm supporting the plate may be aligned with the height of the heating plate. Each support arm members may also include a central portion near the vertical bend, whereby selected support arm members are offset at an angle in the horizontal or vertical plane to permit multiple hinge blocks to pivot in a side-by-side fashion about the support rod and provide a means for stacking multiple support arm members and plates.

In the preferred embodiment the support rod extends through the pivot aperture. Because the plate support arm members are held to the sides of the plates, the width of the plates determine the spatial distance between the floating hinge sets. Moreover, a retaining means for holding the hinge block set in the desired position on the support rod may also be utilized; however, as shown in the drawings it is not necessary. Likewise, retaining means may be used to hold the vertical portion of the plate support arm members at a selected position with respect to the slide aperture in order to maintain a predetermined spacing between the plates; however, it is not necessary because the sliding relationship between the plate support arm member and the slide aperture provides a friction fit which tends to hold the plate at the desired position upon pivoting the plate and plate support arm members.

The floating hinge apparatus allows the plates of a multi-plate heating grill to be hinged individually and to pivot as individually or as one when accessing other than the top plate. The united pivoting movement prevents any relative horizontal movement between the plates which would distort and damage the food articles held thereinbetween. The ability of the plates to move vertically with respect to each other allows the user to simultaneously heat various products which may be of different thicknesses. The floating hinge also provides a means to tilt to ajar orientations in order to maintain and optimize the conduction heat transfer between the surface of the food articles to be heated and the heating surfaces of the plates.

The floating hinge apparatus of the instant invention provides a means for variable spacing between the plates, permits free floating vertical movement between the plates, and prevents relative horizontal movement between the plates by maintaining a common pivot point for all of the plates regardless of the position.

More particularly, the floating hinge mechanism described herein consists of a 90 degree bent rod, either round or of any other desired cross-sectional configuration (e.g., a square, hexagonal, half-round or otherwise configured channel), which along the angular bend side is preferable round for ease of floating, in a respective support block bearing made of Delron or other suitable material, such as Nylon, thus enabling a round rod to "float" within its respective alignment hole with ease, at a minimum friction coefficient between the alignment block bearing the floating rod.

The floating hinge rod mechanism is bent to conform with a multi-deck, horizontally staggered plate configuration floating at a 90 degree angle, in one, two, three, four, five or more vertically tilting plates. In the preferred embodiment the spaces are at least ⅝" apart, in order to accommodate the ⅜" round rod tilting requirements; however, the spacing may be less according to the selection of the materials of construction for the plate support arm members and the means of attachment to the plates. The interdependent, multi-component hinge tilting and horizontally aligning mechanism provide a means to obtain precisely replicable alignments of the plate(s) positioned to maintain constant relative alignment in either horizontal or any other angular position of up to 35 to 50 degrees from its respective tilting axis.

Each plate is secured to a set of tilting hinges and is provided with at least two and preferably four sets of specially designed, spacing means defining variable-height spacer members. The spacer means of the preferred embodiment comprises a block having a cut-out portion formed between a pair of shoulders to pivotally support a plurality of spacer levers which are mounted in an angular, milled housing made of suitable metal or plastic. The spacer means contain a longitudinal member such as a metal rod supported between the shoulders. One or more spacer levers are secured via a rod or pin connected to both sides of the block by the shoulders for nesting a selected number of distancing spacer levers or blades adjoined to each other and capable of being moved selectively and individually on their swing axes along their respective holding pins providing within the mechanism for that purpose.

The floating hinge apparatus and spacer means provides a means of forming infinitely selectable, parallel distance alignment between two or more plates, and maintaining the precise alignment of the plates relative to each other during any tilting configuration ranging from "flat" (0 degree angle) horizontal position up to about a fifty (50) degree angle.

This method and apparatus thereby achieves optimum, horizontal floating alignment while conducting heat to either rigid or flexible food containers, such as metal or plastic packaging for soups in portion-controlled format, or formed plastic containers for an infinite variety of food article of various dimensional configurations. Each package may be sealed for food preservation and bacteriological safety protection against potential contamination during transfer from the primary processor to the ultimate retail consumer through regular transportation channels.

BRIEF DESCRIPTION OF THE DRAWINGS

A better understanding of the present invention will be had upon reference to the following description in conjunction with the accompanying drawings in which like numerals refer to like parts throughout the several views and wherein.

SPECIFICATION

Figure 1:
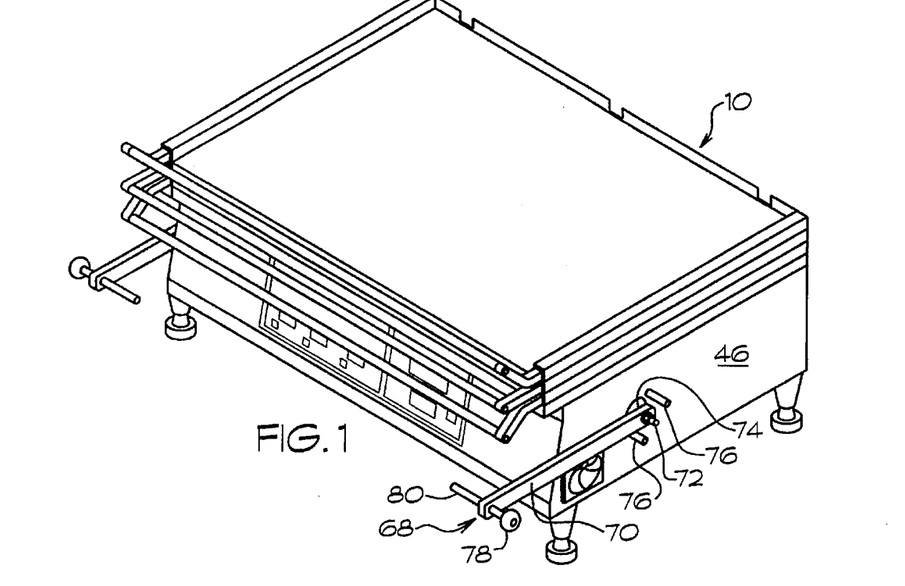
FIG. 1 is a perspective view of a multi-plate grill showing the stacked plates thereon.

FIG. 1 shows a multi-plate heating apparatus 10, more particularly a grill such as is shown and described in U.S. patent applications Ser. No. 08/519,831 and Ser. No. 08/229, 581 incorporated by reference herein.

As shown in FIGS. 2–8, the floating hinge apparatus 12 of the present invention comprises a plate support arm member 14, at least one pair of floating hinge blocks 16, and a support rod 18 therefore. Preferably the floating hinge blocks 16 are composed of nylon, teflon, of some other synthetic polymer such as DELRON™ providing a minimum friction coefficient between the alignment hinge block 16 bearing the plate support arm member 14. It is contemplated that the floating hinge blocks 16, support rod 18, and/or support arm member 14 may also be composed of metal or synthetic material. The hinge block 16 of each floating hinge set 24 is generally square or rectangular in shape, however, it can be formed in any shape to support the plate support arm member 14 and support pivot rod 18 extending therethrough. The plate arm support member 14 may be a rod, tube, strip, or other such longitudinal member.

Figures 2, 3:
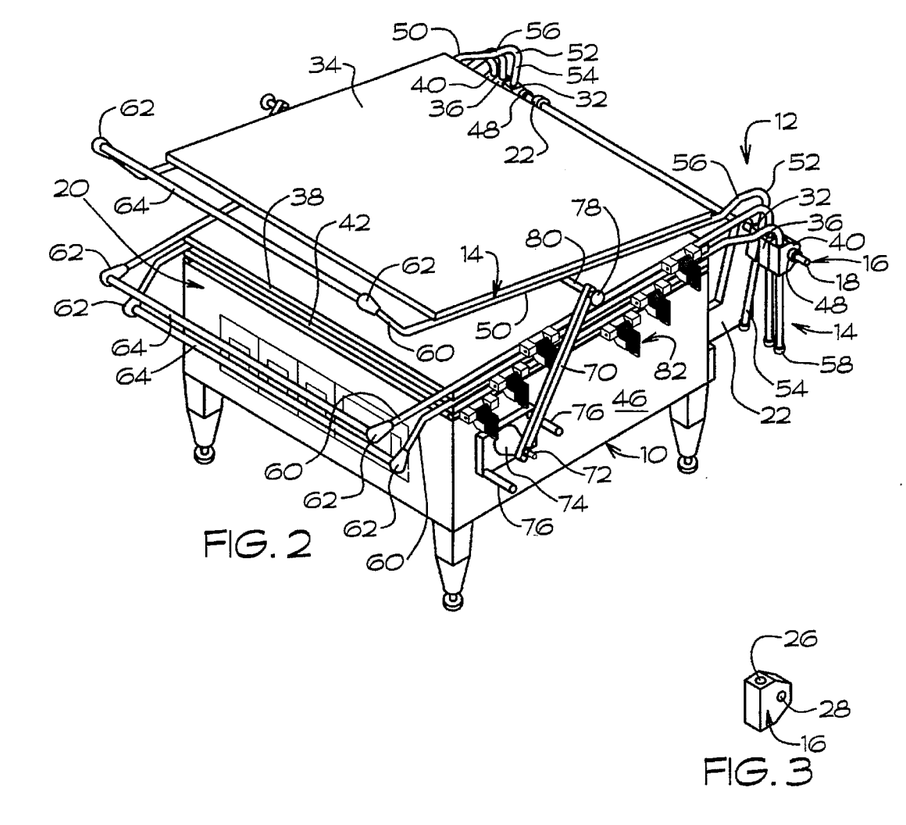
FIG. 2 is a perspective view of a multi-plate grill showing the floating hinge of the present invention having one of the plates elevated and supported in the "up" fill position for receiving food articles.
FIG. 3 is an enlarged perspective view of a hinge block in accordance with the present invention.
Figure 4:
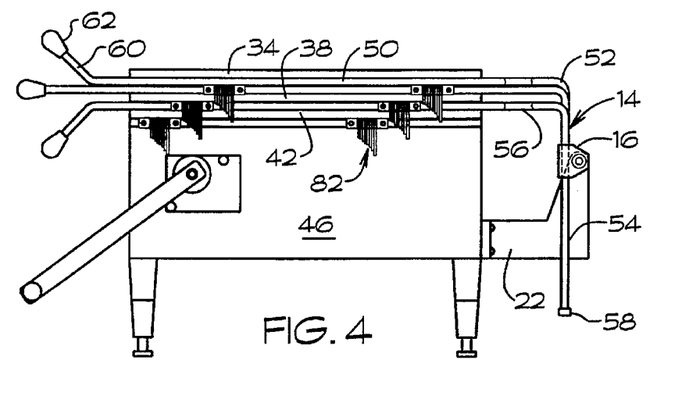
FIG. 4 is a side view of the multi-plate grill and floating hinge also showing spacer means in the resting position.
Figure 5:
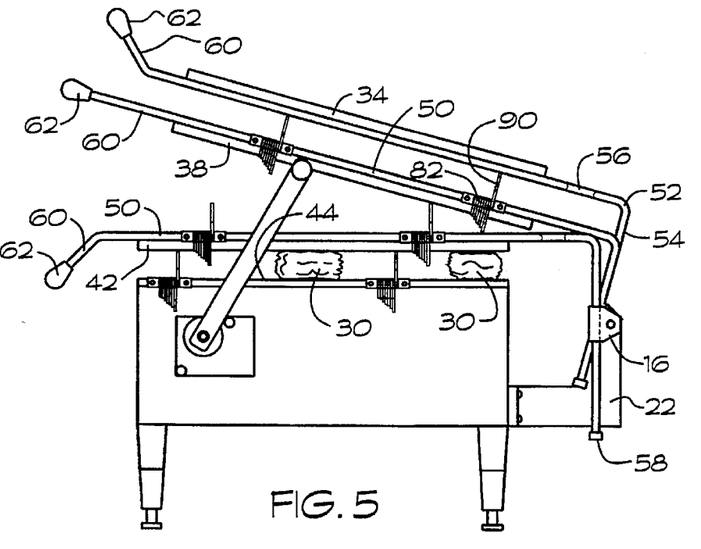
FIG. 5 is a side view of the multi-plate grill and floating hinge invention of FIG. 3, showing the top plate supported by the spacer means and showing the hinge mechanism moving the plates up and back to maintain the plates in equal distance alignment in the horizontal plane regardless of the spacing thereinbetween.
Figure 6:
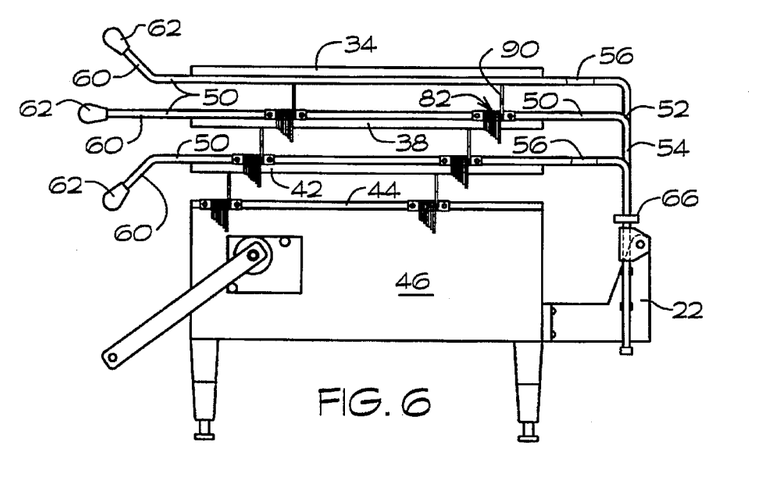
FIG. 6 is a side view of the multi-plate grill and floating hinge assembly showing all of the plates spaced apart equal distance and in alignment with one another showing food articles thereinbetween.

The floating hinge apparatus 12 comprises a multiple-hinged, flotation and horizontally parallel-tilting mechanism to align a multitude of perpendicularly staggered plates 20 in precise horizontal alignments with selectable height distances relative to each other. The adjustable hinge apparatus 12 is provided for use with a grill 10 having multiple stacked heating plates 20. A horizontal support pivot rod 18 extends from one side of the grill, preferably the rear side, to form a common pivot axis. A pair of mounting brackets 22 having at means for supporting the support pivot rod 18, such as a hole in the horizontal axis, extend outwardly away from the grill 10 spaced apart and in alignment with one another to support the support pivot rod 18 extending thereto, or therethrough. Of course, it is contemplated that a each side of the housing 46 could utilize a pair of support brackets 22 having a short support rod extending therein-between for pivoting support therearound. The floating hinge apparatus 12 comprises an array of hinge blocks 16 forming a hinge block set 24 on each side of the grill 10, whereby a plurality of hinge blocks 16 are positioned adjacent one another on the support rod 18. As best illustrated in FIG. 3, each floating hinge apparatus 12 includes a hinge block 16 having a pivot aperture 26 generally positioned in the horizontal axis in alignment with the pivoting side of the grill 10 sized for pivoting or rotating movement of the horizontal support pivot rod 18 extending therethrough. Each floating hinge block 16 also includes a slide aperture 28 generally positioned in the vertical axis and generally normal to the pivot aperture 26, wherein the slide aperture 28 provides a means for sliding movement of a plate support arm member 14 extending therethrough. The plate support arms 14 of adjacent hinges 16 are formed for attachment with consecutively stacked heating plates 20 and the hinge block 16 of each hinge block set 24 is formed to pivot or rotate on the support pivot rod 18 perpendicular to the pivot axis and independently of adjacent hinge blocks 16. The adjustable hinge apparatus 12 of the present invention allows the heating plates 10 to self-adjust relative to one another to accommodate various thickness of food articles 30 between two sets of plates 20 and provide means for pivoting the stacked heating plates 20 simultaneously about a common pivot axis.

In the preferred embodiment, two floating hinge block sets 24 comprise a pair of floating hinge blocks 16 situated on opposite ends of a horizontal support pivot rod 18 in spaced apart relation to one another. Each floating hinge set 24 includes a plurality of adjustable hinge blocks 16, three are shown in the drawings, positioned in mirror-image orientation relative to one another. The floating hinge block sets 24 include a pair of inner hinge blocks 32 formed for attachment to a top plate 34, a pair of center hinge blocks 36 formed for attachment to a middle plate 38, and a pair of outer hinge blocks 40 formed for attachment with a lower plate 42 spaced apart from the top heating surface 44 of the grill housing 46.

The floating hinge blocks 16 of each hinge block set 24 are held in side-by-side orientation and prevented from sliding on the support rod parallel to the pivot axis by retaining means 48 such as bushings, retainer rings, pins, or clip and groove arrangements, which promote the independent sliding of the floating hinge blocks 16 relative to one another and permit the floating hinge blocks 16 to tilt to an ajar orientation to accommodate various thickness of food articles 30 between the plates 20.

As shown in the preferred embodiment in FIGS. 2, and 3–8, the plate arm support member 14 comprises a first end defining a horizontal section 50 for attaching to and supporting a plate 20, a center section 52 bent downward at about a ninety (90) degree angle so that a portion of the plate support arm member supporting the plate is oriented in the horizontal plane and the portion in slidable engagement with the hinge block 16 is oriented in the vertical plane comprising a second end defining a vertical section 54. The plate support arm member 14 is slidably received within the slide aperture 28 whereby the vertical section of the plate support arm member 54 extending downward in the vertical direction through the slide aperture 28 may be adjusted so that the horizontal portion 50 of the plate support arm member 14 may be aligned with the height of the heating plate 20 in the horizontal plane. As shown best in FIGS. 2 and 7, selected plate support arm members 14 include an offset region 56, before, at, or after the vertical bend of the center section 52 forming a "S" curve, whereby selected plate support arm members 14 are offset at an angle in the horizontal or vertical plane to permit multiple hinge blocks 16 to pivot in a side-by-side fashion about the support pivot rod 18 and provide a means for stacking multiple plate support arm members 14 and plates 20. The plate support arm members 14 may optionally include a weight or counterbalance 58 on the distal end of the vertical section 54. The distal end section 60 of the plate arm support members 14 may be straight as shown for the middle plate 38, or curved upward as shown with plate 34, or curved downward as shown by plate 42. It is contemplated that the distal end section 60 may also be curved inwardly or outwardly for easy recognition and holding. Moreover, a knob 62 may be attached to the distal end of each plate support member 14 and/or a cross member 64 may connect the knobs 62 or distal end sections 60 of the two aligned plate support arm members 14 support any one plate 20.

Figure 7:
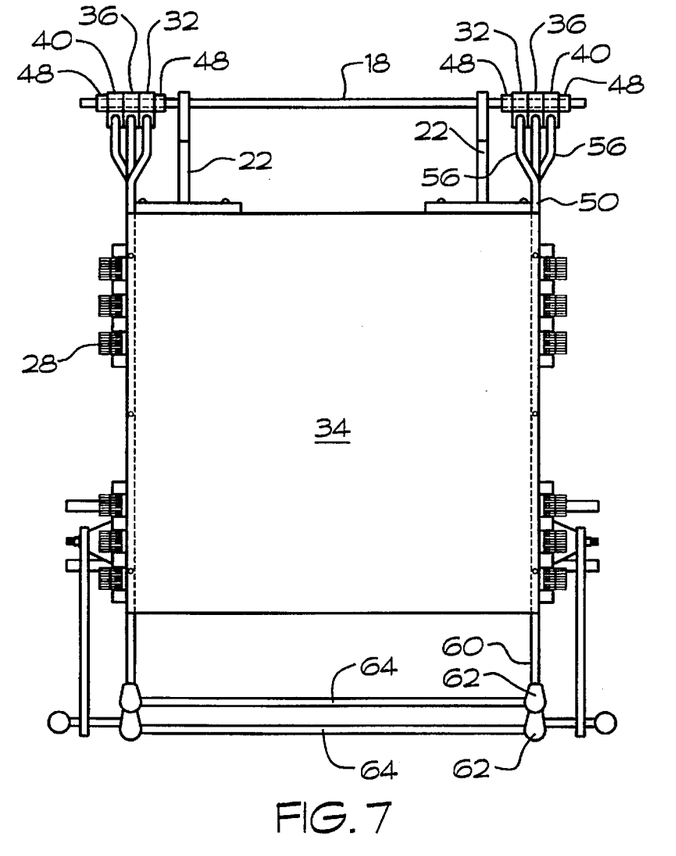
FIG. 7 is a top view of the multi-plate grill showing the offset arrangement of floating hinge supported by a single horizontal support rod member and the spacers attached to the sides of the plates.
Figure 8:
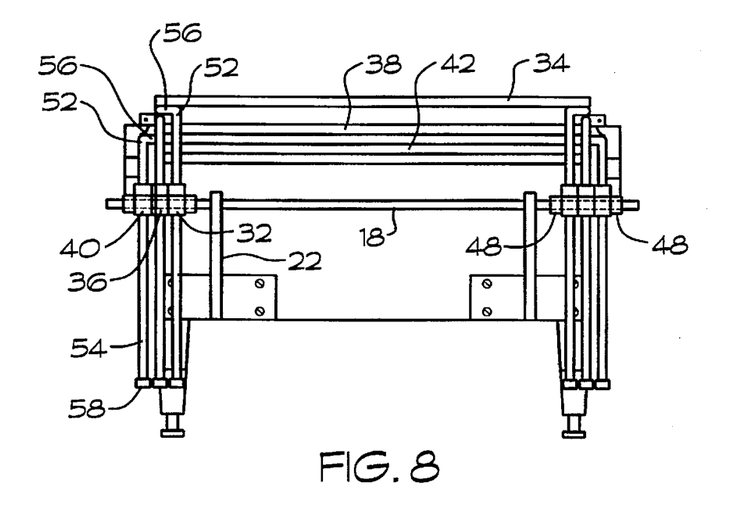
FIG. 8 is a rear view of the multi-plate grill showing the offset arrangement of the floating hinge support members supported by a single support rod member.
Figure 9:
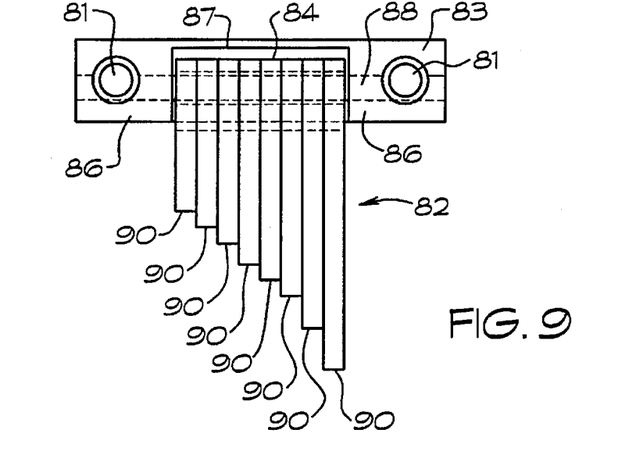
FIG. 9 is a front view of a spacer used in combination with the floating hinge assembly to maintain the equal distance of the plates in the horizontal "in-use" position.

As illustrated in FIGS. 2, 7–8, the preferred embodiment shows that the support pivot rod 18 extends through the pivot aperture 26. Because the plate support arm members 14 are held to the sides of the plates 20, the width of the plates 20 determine the spatial distance between the floating hinge block sets 24. However, the plate support arm members 14 may be attached to the plates 20 by other means such as by a tongue and groove arrangement; therefore, a retaining means 48 for holding the hinge block sets 24 in the desired position on the support pivot rod 18 may also be utilized. As shown in the preferred embodiment the retaining means is not always necessary. Likewise, arm retaining means 66 positioned on the vertical section 54 of the plate support members 14 may be used to hold the vertical portion of the plate support arm members 14 at a selected position with respect to the slide aperture 28 in order to maintain a predetermined spacing between the plates 20. Of course the sliding relationship between the plate support arm member 14 and the slide aperture 28 may provide sufficient support via a friction fit which tends to hold the plate support arm member 14 at the desired position upon pivoting the plate 20 and plate support arm members 14.

The floating hinge apparatus 12 allows the plates of a multi-plate heating grill 10 to be hinged individually and to pivot as individually or as one when accessing other than the top plate 34. The united pivoting movement prevents any relative horizontal movement between the plates 20 which would distort and damage the food articles 30 held therein-between. The ability of the plates 20 to move vertically with respect to each other allows the user to simultaneously heat various products which may be of different thicknesses. The floating hinge apparatus 12 also provides a means to tilt to ajar orientations in order to maintain and optimize the conduction heat transfer between the surface of the food articles 30 to be heated and the heating surfaces of the plates 20.

The floating hinge apparatus 12 of the instant invention provides a means for variable spacing between the plates 20, permits free floating vertical movement between the plates 20, and prevents relative horizontal movement between the plates 20 by maintaining a common pivot point for all of the plates 20 regardless of the position.

The length of the central section or bend 52 of the plate support arm member 14 is determined by bending the arc member 14 to conform with the level of the multi-deck, horizontally staggered plate floating at a 90 degree angle, for one, two, three, four, five or more vertically tilting plates 20. In the preferred embodiment the spaces between the plates 20 are at least ⅝" apart, in order to accommodate the ⅜" round rod tilting requirements; however, the spacing may be less according to the selection of the materials of construction for the plate support arm members 14 and the means of attachment to the plates 20. The hinge block sets 24 form an interdependent, multi-component hinge tilting and horizontally aligning mechanism providing a means to obtain precisely replicable alignments of the plate(s) 20 positioned to maintain constant relative alignment in either horizontal or any other angular position of up to 35 to 40 degrees or as great as 85 degrees from its respective tilting axis.

As shown in FIGS. 1–2, and 4–8, a pivoting plate and plate support arm holding assembly 68, "pivoting arm holding assembly". The pivoting arm holding assembly 68 consists of a lever 70 connected to the sides of the grill housing 46 by an attachment means, such as a bolt 72. A spacer means 74 of a selected thickness is positioned between the lever 70 and housing 46 depending on the width of the plates 20 as compared to the housing 46. A pair of stop means such as pegs 76 extend outwardly from the housing 46 a selected distance to limit the movement of the lever 70. A handle 78 having a longitudinal member 80 extending inwardly a selected distance is attached perpendicular to the distal end of the lever 70. The pivoting arm holding assembly 68 is pivoted backward so that the when the plates 20 are pivoted, the lever 70 is pivoted backward so that the longitudinal member 80 of the lever 70 is supported by the pegs 76 providing a means of support for the bottom of the plates 20 when the plates 20 are pivoted upward in the open position. When the plates 20 are in the horizontal resting position, the lever 70 pivots downwardly in front of the housing 46.

As illustrated in FIGS. 2, and 4–11, each plate 20 is provided with a spacer means 82. The multi-deck grill 10 utilizes shown in the preferred embodiment comprises at least two and preferably four sets of specially designed, variable-height spacer means removably attached to the sides of the plates 20 or plate support arm members 14;

however, it is contemplated that a single, spacer means 82 could be utilized at the front of the plate 20 opposite the floating hinge apparatus 12.

The spacer means 82 of the preferred embodiment comprises a block of materials preferably composed of metal; however, synthetic polymers such as DELRON™, nylon, or teflon would also be feasible. The preferred embodiment of the spacer means 82 comprises a block 83 having a rear exterior surface 85 curved slightly for attachment to the side of a plate 20 or plate support member 14. The block 83 includes an interior cut-out portion 84 forming an angular, milled housing in between a pair of shoulders 86. In the preferred embodiment, a pair of attachment holes 81 are formed through the shoulders 86 along the horizontal axis for attachment to the side edge of a plate 20. A longitudinal member such as a metal pin 88 is supported between the shoulders 86. The cutout portion 84 of the block 83 has a flat bottom surface and side surfaces adjacent to the shoulders 86 thereof; however, the rear sidewall 87 of the cut out portion 84 extending parallel with the pin 88 is angled outwardly at an angle of about 60 degrees.

At least one, and preferably a plurality of distancing spacer members or blades 90, having a hole 92 near one end are pivotally connected to the block 83 by the pin 88 and nested therein adjoined to each other and capable of being moved selectively and individually on their swing axis along the holding pin 88.

Figure 10:
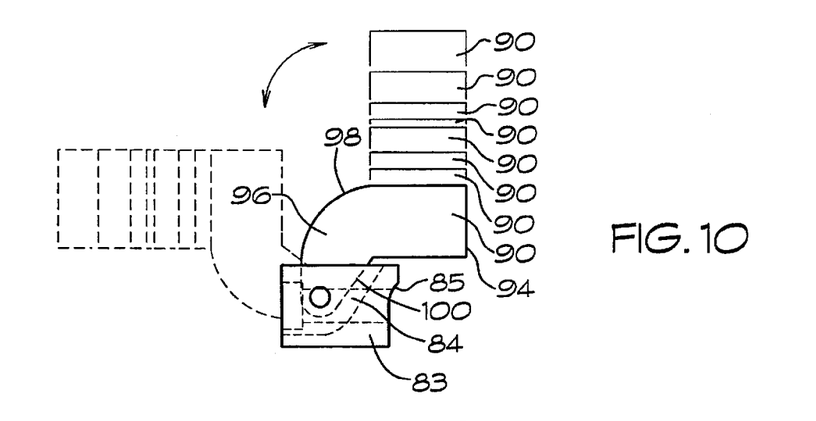
FIG. 10 is a rear view of a spacer showing the sequential movement of one of the spacer members.
Figure 11:
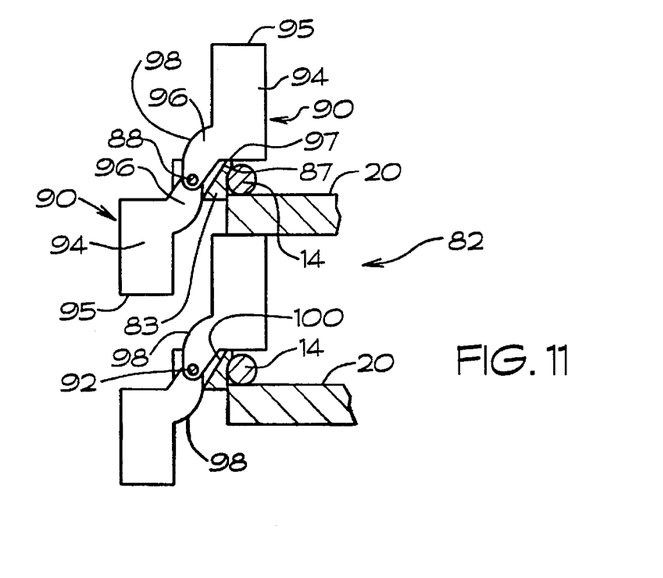
FIG. 11 is a partial sectional view showing a section of a plate and support means therefore supported by a single spacer member wherein the remaining spacer members remain in the resting position.

As shown best in FIGS. 10-11, each blade 90 is formed having a top portion 94 defining a flat top surface 95 for supporting the bottom of a plate 20 or plate arm support member 114. The top portion 94 is generally square or rectangular depending on the length or height thereof. The length of the top portion 94 for each blade 90 is formed in increments which are progressively longer in order to provide easily adjustable spacing between the plates 20 as shown best in FIGS. 6, 9, and 10. The top portion 94 joins a bottom portion 96 which is rectangular in the preferred embodiment, but may be formed in other convenient shapes. The preferred embodiment includes an arcuate or curved portion 98 which includes an edge 100 which may be shaped or angled for cooperative engagement with the cut out portion 84 of the block 83 as shown in FIG. 10. The bottom portion 96 includes a hole 92 therein for pivoting about the pin 88 and allows the blade 90 to pivot and the top portion 94 to disengage from the plate 20. The blades 90 are supported in the pivoted "up plate supporting" position whereby the bottom portion 97 of the top section 94 rests upon the lip 87 of the block 82.

The floating hinge apparatus 12 and spacer means 82 provides a means of forming infinitely selectable, parallel distance alignment between two or more plates 20, and maintaining the precise alignment of the plates 20 relative to each other during any tilting configuration ranging from a flat (0 degree angle) horizontal position up to about an eighty-five (85) degree angle, but generally up to about a 50 degree angle.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. An adjustable floating hinge apparatus for use with a cooking or staging grill defining a housing having a heating surface and at least one plate for heating food articles thereinbetween, comprising:

said housing including a pair of brackets extending outwardly therefrom;

a support rod supported by said bracket;

at least two longitudinal members, each of said longitudinal members having a downwardly directed ninety degree bend defining a horizontal first end and a vertical second end, said longitudinal members being spaced apart from one another for supporting said plate thereon; and at least one hinge block set, each of said hinge block sets comprising one hinge block having a pivot aperture for cooperative engagement with said support rod extending therethrough for pivoting movement therewith, said hinge block having a sliding aperture for cooperative engagement with a longitudinal member extending therethrough for sliding movement therewith.

2. The adjustable floating hinge of claim 1, further said support rod supporting a plurality of said hinge block sets aligned adjacent one another, each of said hinge block sets supporting a pair of longitudinal members supporting wherein each set of longitudinal member support a plate, wherein each hinge block is free to tilt to an ajar orientation relative to said adjacent hinge blocks.

3. The adjustable floating hinge of claim 1, wherein said sliding aperture is aligned perpendicular to said pivot aperture.

4. The adjustable floating hinge of claim 1, further comprising retaining means for preventing sliding movement of said hinge block parallel to the common pivot axis of said support rod.

5. The adjustable floating hinge of claim 1, wherein said longitudinal member include a distal end comprising a counterweight retaining means.

6. The adjustable floating hinge of claim 1 wherein a first plate is attached to said first ends of a first set of longitudinal members having second ends which extend through a first set of hinge blocks, and a second plate is attached to said first ends of a second pair of longitudinal members having second ends which extend through a second adjacent set of hinge blocks, wherein at least one of said longitudinal members include a central portion offset at a predetermined angle positioning the hinge blocks in a side-by-side orientation parallel to the pivot axis and the first opposite ends of longitudinal members in a stacked orientation relative to one another substantially perpendicular to the pivot axis.

7. The adjustable floating hinge of claim 1, wherein said sliding aperture is positioned in front of said pivot aperture.

8. The adjustable floating hinge of claim 1, including a spacer means providing a means of forming infinitely selectable, parallel distance alignment between the housing and one or more plates, and for maintaining the precise alignment of the plates relative to each other during any tilting configuration ranging from the flat resting horizontal position up to about a 85 degree angle.

9. The adjustable floating hinge of claim 1, including a spacer means providing a means of forming infinitely selectable, parallel distance alignment between the housing and one or more plates, and for maintaining the precise alignment of the plates relative to each other during any tilting configuration ranging from the flat resting horizontal position up to about a 50 degree angle.

10. The adjustable floating hinge of claim 1, including a means for retaining said longitudinal member at a selected position with respected to said hinge block.

11. The adjustable floating hinge of claim 8, wherein said spacer means comprises a block including a cut out portion forming shoulders on each side thereof and an interior side wall, a longitudinal member disposed between said shoulders, and at least one spacer member pivotally supported by said pin for engaging the bottom of said plate, said spacer member resting against said side wall of said block.

12. The adjustable floating hinge of claim 8, wherein said spacer means includes a plurality of spacer members, each one having a top plate supporting portion and a bottom pivot portion wherein said top plate supporting portion for each spacer member is defines a different length for providing various spacing adjustments between said plates.

13. The adjustable floating hinge of claim 8, wherein said spacer means comprises a block including a cut out portion forming shoulders on each side thereof and an interior side wall defining a support lip, a longitudinal member disposed between said shoulders, and at least one spacer member pivotally supported by said pin by a bottom portion including a hole in cooperative pivoting engagement with said pin, said spacer member including a top portion having a top surface for engaging the bottom of said plate and a bottom portion for engaging the support lip of said side wall.

14. A cooker comprising a housing, an array of stackable heating plates positioned consecutively atop the housing, a support rod mounted on the housing and providing a common pivot axis for the heating plates, and an array of hinges, each hinge connecting one of the array of plates for rotation about the support rod, each hinge including a hinge block having a pivot aperture sized for receiving the support rod therein and a longitudinal member mountably engaging one of the consecutively stacked heating plates so that each hinge block can pivot about the common pivot axis and slide on the support rod substantially perpendicularly to the common pivot axis to establish different heights between the plates.

* * * * *